Oct. 31, 1967     E. BROCHER ETAL     3,350,584
METHOD OF AND GENERATOR FOR PRODUCING ALTERNATING ELECTRIC POWER
Filed April 15, 1964
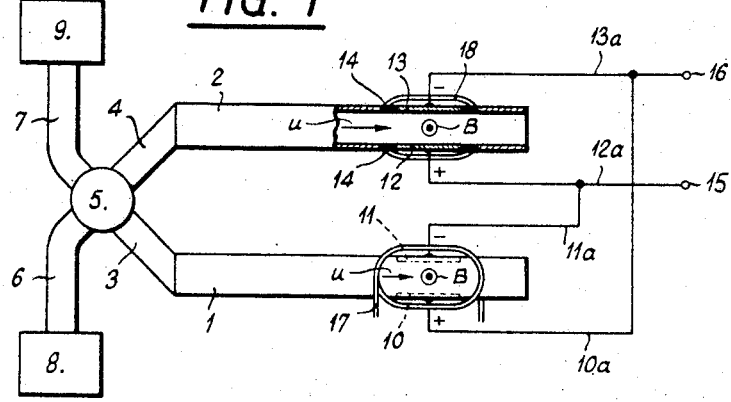
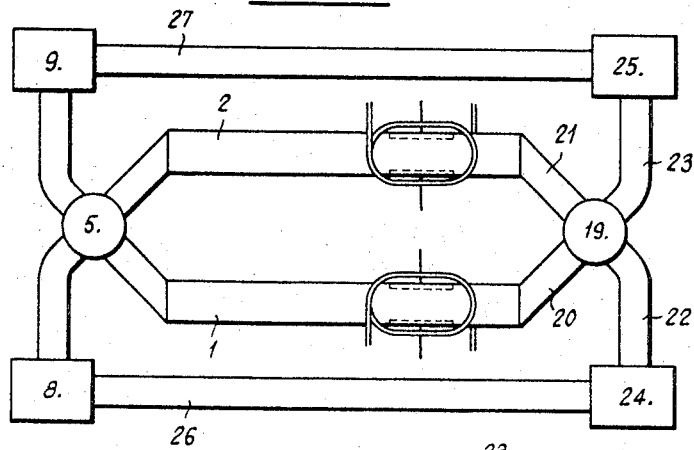
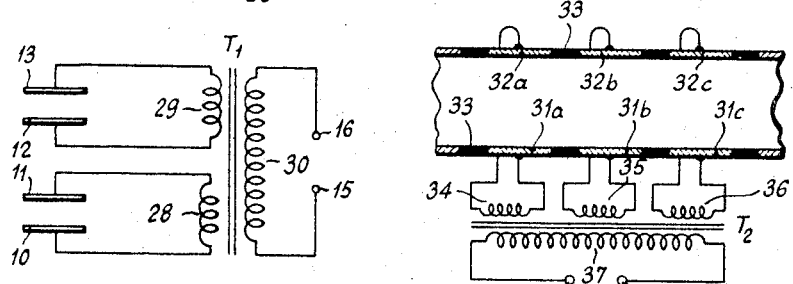

United States Patent Office 3,350,584
Patented Oct. 31, 1967

3,350,584
METHOD OF AND GENERATOR FOR PRODUCING ALTERNATING ELECTRIC POWER
Eric Brocher, 4 Chemin de l'Ecorcherie, Vandoeuvres, and Walter Dallenbach, 6 Sagerstrasse, Bern, Switzerland
Filed Apr. 15, 1964, Ser. No. 359,874
Claims priority, application Switzerland, Apr. 16, 1963, 4,653/63
8 Claims. (Cl. 310—11)

This invention relates to a method of producing alternating electric power by the interaction of a train of ionised gas impulses and a magnetic field, and to a generator for performing such method.

It is well known that electric power can be produced if a gas which has been partially ionised to render it electrically conductive is passed through a magnetic field so that the thermal and kinetic energy of the gas are directly converted to electric power. This method is therefore based on the ionisation of a gas, and this ionisation is possible only at very high temperatures. Gas ionisation is generally very weak even at flame temperature, i.e. at a temperature ranging between 2000 and 3000° K. Gases are appreciably ionised and become electrically conductive only at very high temperatures of about 10,000° K. It is very difficult to obtain such temperatures with thermal energy sources at present available. Also the problems in connection with the strength of the materials containing gases at these high temperatures would be extremely difficult to solve.

The conductivity of the gases must therefore be increased by the addition of small quantities of alkali metals so that reasonable temperatures can be used. Since the ionisation potential of alkali metals is very low, the same ionise at relatively low temperatures. Thus in the case of argon to which cesium has been added a temperature of about 2300° K. gives a conductivity of 1 mho/cm., which can be considered adequate to give a good specific power in view of the magnetic field intensities at present possible (10,000 to 20,000 Gauss). On the other hand, a temperature of about 3000° K. is required for combustion gases to which potassium has been added.

The processes at present used to give the high temperatures required for the ionisation of gases are generally based on combustion, more particularly steady combustion. The resultant ionised gas and electric current are therefore continuous.

The materials used for the generators are therefore also continually at high gas temperatures, and this leads to practically insoluble problems industrially.

To produce alternating power by the same principle, which is also known as the magnetohydrodynamic principle, one of the factors, namely the fluid conductivity, its speed, or the magnetic field, must of course be varied.

Various methods have been proposed, some of which are based on variation of the magnetic field and others on variation of the speed of the fluid and/or its conductivity. The first-mentioned processes do not appear to have any practical advantage because of the disproportion between the reactive electric power required to give the magnetic field and the active electric power that can be produced by the generator with such a field. The former is in fact several times greater than the latter.

Processes based on the principle of varying the speed of the fluid and/or its conductivity are much more advantageous. The speed and conductivity of the fluid may be varied by pulsated or intermittent combustion, or by shock or detonation waves.

The method based on the use of shock waves—which at present has not passed the laboratory experimental stage—comprises producing an ionised gas impulse train in a shock tube alternately in each direction by means of shock waves produced by ignition of a combustible mixture introduced and ignited alternatively at the two tube ends. Since the latter is at ambient temperature very powerful shock waves are required to give the ionisation temperatures. Powerful shock waves of course are ineffective thermodynamically because of the high entropy increase they produce. The plasma pulse times that they give are only a few tens of microseconds. The pulse time is in fact proportional to the difference between the shock wave speed and the speed of the contact surface between the driving gas and the driven gas, such difference decreasing with an increase in shock wave power.

The method according to the invention is based on the use of shock waves with the object of obviating the above disadvantages.

According to the present invention there is provided a process for producing alternating electric power by the interaction of a train of ionised fluid impulses and a magnetic field, characterised in that there are introduced successively and cyclically into at least one pair of shock tubes: in a first stage a fluid preheated to a temperature of between 1000 and 2000° K. and, in a second stage, a fluid preheated to substantially the same temperature but whose static pressure is 2 to 50 times higher than that of the first fluid, ionised gas impulse trains obtained in the form of shock waves are passed through each of the two tubes and through a magnetic field across the latter, between at least two electrodes parallel to the field, so as to give a voltage pulse train at the electrodes of each tube, and the electrodes of a pair of tubes are connected to the output terminals so as to give an alternating voltage whose cycle is formed by two half-waves each produced by a respective tube of the pair of tubes.

The method therefore comprises producing shock waves in a preheated fluid. The preheating temperature may vary between 1000 and 2000° K. It will depend on the fluid used, i.e. on the temperature required for adequate ionisation of the fluid, and on the power of the shock waves used. This shock wave power must be so selected that an adequate plasma impulse time is produced, i.e. an impulse time of about one millisecond. Thus, for example, in the case of a noble gas to which the vapor of an alkali metal has been added, where adequate ionisation occurs at about 2500° K., the preheating temperature must be about 1500° K. where the shock waves used are obtained with a driving gas/driven gas pressure ratio of 10:1.

With regard to the nature of the driven gas, i.e. the preheated gas in which a shock wave is produced to raise its temperature and hence produce its partial ionisation, it may be any gas already considered in the known processes, and to which an alkali metal has been added. Thus combustion gases may be used with the addition of potassium for example. A noble gas may be used, such as argon or helium, to which cesium has been added (about 1%), whose conductivity at a given temperature is much greater than that of combustion gases to which potassium has been added.

The driving gas—i.e. the higher-pressure gas which is to produce a shock wave in the driven gas—may or may not be of the same nature as the latter. For thermal efficiency reasons it is preferable for it to be preheated to a temperature substantially the same as that of the driven gas.

To produce shock waves of sufficient thermodynamic efficiency, the ratio of the static pressures of the driving and driven gas should not be above 50:1. Also, to obtain a sufficient temperature increase and gas speed, this pressure ratio must not be less than 2:1.

The gases may be preheated either by combustion of such gases or by heating in a heat exchanger. One of the advantages of the method is that the thermal energy source used may be selected from sources operating at temperatures corresponding to the preheating temperatures and not to the gas ionisation temperatures. This enables nuclear thermal energy sources to be used.

The invention also provides, a generator for performing the method set out hereinbefore, characterised in that it is formed by at least one pair of shock tubes, one of the ends of each tube being connected via a distributor to two tanks each containing a fluid preheated to substantially the same temperature between 1000 and 2000° K., the pressure ratio of the two fluids being between 2:1 and 50:1, the distributor being so arranged as to introduce successively and cyclically into the tubes of the pair, in a first stage, the lower-pressure fluid and, in a second stage, the higher-pressure fluid, each of the tubes having near its other end at least two electrodes disposed one opposite the other in parallel relationship to its axis, a magnetic field disposed in parallel relationship to the electrodes and transversely of the tube being provided in each tube, the electrodes of one pair of tubes being connected to the output terminals so as to give at the latter an alternating voltage whose cycle is formed by two half-waves each produced by a respective tube of the pair of tubes.

The accompanying drawings diagrammatically illustrate, by way of example, two embodiments of, and two modifications of part of, a generator according to the invention.

FIG. 1 is a partial sectional view of a first embodiment of generator according to the invention.

FIG. 2 is a similar view of a second embodiment of generator according to the invention.

FIGS. 3 and 4 each show a modification of a part of the generator.

Referring to FIG. 1, the generator comprises two shock tubes 1 and 2 of rectangular cross-section disposed in parallel relationship to one another. One of the ends of each of the tubes 1 and 2 is connected via a respective conduit 3 and 4 to a distributor 5, which is connected via a respective conduit 6, 7 to a respective tank 8, 9.

The distributor 5 is so arranged as to connect the two tubes 1, 2, successively and cyclically, to each of the two conduits 6 and 7 and hence to each of the two tanks 8 and 9.

Near their other end the tubes 1 and 2 are each provided with a pair of electrodes 10 and 11, 12 and 13, each electrode of each pair being fitted in an opposite wall of the associated tube, one opposite the other and in parallel relationship to the tube axis. The electrodes 10, 11, 12, 13 are insulated from the respective tube 1, 2 by insulating spacers 14. To each of the electrodes 10 to 13 is secured a lead, 10a to 13a respectively, for connection to a respective one of the two output terminals 15 and 16. In the example illustrated, the electrodes 10 and 13 are connected to the terminal 16 and the electrodes 11 and 12 are connected to the terminal 15.

Each of the tubes 1 and 2 extends through the air gap of an electromagnet, only the windings (17 and 18 respectively) of which are shown in the drawing. Each of the electromagnets 17 and 18 is so located and arranged, in the region of the electrodes, that the magnetic field B which is produced is orientated transversely of the tube 1, 2 and parallel to the electrodes 10 to 13. The windings 17, 18 of the electromagnets are so arranged that the two fields B have the same direction, as is indicated in FIG. 1.

The generator as described above operates as follows:

The two tanks 8 and 9 each contain a fluid preheated to 1700° K., for example combustion gases to which 1% of potassium has been added. The fluid in the tank 8 to which the conduit 6 is connected is at normal static pressure, while the fluid in the tank 9 to which the conduit 7 is connected is at a static pressure of 25 atmospheres.

Distributor 5 is so arranged that, in a first stage, it connects the conduit 6 to the conduit 3 and the conduit 7 to the conduit 4. Tube 1 is consequently filled with preheated fluid at normal static pressure and the tube 2 is filled with preheated fluid at a static pressure 25 times higher. In the next stage, the conduit 6 is connected to conduit 4 and conduit 7 to conduit 3 so that the high-pressure fluid is introduced into the tube 1 and the normal-pressure fluid into the tube 2.

The high-pressure gas arriving at high speed in the tube 1 produces a shock wave in the normal-pressure gas therein. There is therefore a high acceleration of the latter gas and heating to a temperature of about 3000° K., i.e. the temperature required for adequate ionisation. The ionised gas impulse thus produced passes between the electrodes 10 and 11 and in so doing converts some of its thermal and kinetic energy to electric energy in the form of a voltage pulse appearing between the electrodes. With the speed of gas $u$ in the sense shown in FIG. 1 and the magnetic field B having the directions shown in FIG. 1, the electrode 10 will be positive and the electrode 11 negative.

The passage of the driving gas between the electrodes 10 and 11 will not produce any current pulse, since the gas temperature and hence its ionisation are inadequate.

In the next stage, i.e. during the first stage of the next distribution cycle, the tube 1 will be filled with gas at normal pressure and the tube 2 with gas at high pressure. In the latter tube 2 a shock wave will be produced in the normal-pressure gas therein following the second stage of the previous cycle. The plasma impulse passing between the electrodes 12 and 13 will produce a voltage pulse between them. The directions of the speed $u$ and of the field B being the same as in tube 1, the electrode 12 will be positive and the electrode 13 negative.

The positive electrode of one tube and the negative electrode of the other tube being connected to the same output terminal, it will readily be seen that there will appear between the two terminals 15 and 16 an alternating voltage whose two half-waves are produced during respective half cycles of one cycle of the distributor 5, one such half-wave being produced by tube 1 and the other by tube 2. The frequency of this voltage will depend on the speed of the distributor 5.

The generator described operates with an open thermal circuit, i.e. the gases used are not recovered.

FIG. 2 shows an embodiment of the generator according to the invention intended for operation with a closed thermal circuit, i.e. with gas recovery.

Referring to the drawing it will be seen that the end of each of the tubes 1 and 2 forming the outlet for the gases used is connected to a second distributor 19 through a conduit 20 and 21 respectively. Distributor 19 is connected via conduits 22 and 23 to respective heat and pressure exchangers 24 and 25, the first of which is connected to the tank 8 by a conduit 26 and the second to the tank 9 by a conduit 27.

This generator operates as follows:

Tank 8 contains, for example, argon at normal pressure, preheated to 1500° K., with an addition of approximately 1% of cesium, while the tank 9 contains the same gas preheated to the same temperature but at a static pressure 25 times greater. The gas is introduced into the shock tubes 1 and 2 and the shock waves and hence the plasma pulses required for the production of alternating electric power are produced in the same way as explained hereinbefore in connection with the first embodiment as illustrated in FIG. 1. The difference lies in the closed thermal circuit used for the gas recovery, and this operates as follows:

When the driven gas leaves the tube, it passes to the distributor 19 which passes it to the heat exchanger 24 where its temperature is brought to 1500° K., whereupon it is taken through conduit 26 to tank 8. The same applies to the driving gas: at the tube outlet it is taken to the distributor 19 which supplies it to the exchanger 25 where its temperature and pressure are brought to the initial values and from which it is taken via conduit 27 to tank 9.

The advantage of the closed thermal circuit generator is therefore the fact that the gases can be recovered so that more expensive gases can be used, such as noble gases, whose conductivity at a given temperature is much greater than that of the combustion gases. For example, at 2000° K. the conductivity of argon to which cesium has been added is 30 times greater than that of combustion gases to which potassium has been added.

The generator comprising one pair of shock tubes, of which two embodiments have been described hereinabove, therefore produces a single-phase alternating power. A generator can, of course, be provided to produce polyphase power. It would comprise a number of pairs of shock tubes equal to the number of phases. The tubes would be connected via one or more distributors to the two tanks respectively containing the driven fluid and the driving fluid.

The electrodes 10 to 13 of the two tubes 1, 2 of a pair of tubes may be connected to the output terminals so as to reduce the risk of any mutual influence. FIG. 3 shows such a possibility. It will be apparent that the electrodes 10 and 11, 12 and 13 of each of the two tubes 1, 2, are connected to a separate winding 28 and 29 respectively, the two windings being in opposition and forming the primary of a transformer T1 whose secondary winding 30 is connected to the output terminals 15 and 16.

It is well-known that the use of strong magnetic fields has the disadvantage of the Hall effect, which reduces the generator output. This Hall effect can be greatly reduced by segmentation of the electrodes in the direction perpendicular to that of the gas flow. Such a variant of the electrodes is shown in FIG. 4. Each of the two electrodes of a shock tube is segmented into three segments, 31a, 31b, 31c and 32a, 32b, 32c respectively, which are separated from one another and from the tube by the insulating spacers 33.

According to one feature of the invention, each pair of segments 31a, and 32a, 31b and 32b, 31c and 32c comprising a segment of each of the electrodes of a tube is connected to a primary winding, 34, 35 and 36 respectively of a transformer T2 comprising just one secondary winding 37 connected to the output terminals. In this way, the three windings 34 to 36 are induction-coupled.

We claim:

1. A generator for producing alternating electric power from the interaction of ionised fluid impulses with a magnetic field comprising; a first shock tube and a second shock tube, said first and second shock tubes each having an input and an output end, distributor means, first tank means containing a first fluid at a first pressure and at a temperature of the order of between 1000° K. and 2000° K., second tank means containing a second fluid at a second pressure and at a temperature of the order of between 1000° K. and 2000° K., said first pressure and said second pressure being in the ratio of the order of between 1:2 and 1:50, said distributor means being effective to connect each of said first and second tank means in turn, successively and cyclically, to each of said first and second shock tubes, first electrode means, second electrode means, said first and second electrode means being located in said first shock tube and symmetrically with respect to the axis of said first shock tube, and electrically insulated therefrom, third electrode means, fourth electrode means, said third and fourth electrode means being located in said second shock tube, symmetrically with respect to the axis thereof and electrically insulated therefrom, means producing a magnetic field through said shock tubes, transversely thereof parallel to said electrode means, a first transformer winding connected across said first and second electrode means, a second transformer winding connected across said third and fourth electrode means, and a transformer secondary winding, in common with both said first and second transformer windings, providing an alternating current output from the generator.

2. A generator for producing alternating electric power from the interaction of ionised fluid impulses with a magnetic field comprising; a first shock tube and a second shock tube, said first and second shock tubes each having an input end and an output end, distributor means, first tank means containing a first fluid at a first pressure and at a temperature of the order of between 1000° K. and 2000° K., second tank means containing a second fluid at a second pressure and at a temperature of the order of between 1000° K. and 2000° K. said first pressure and said second pressure being in the ratio of the order of between 1:2 and 1:50, said distributor means being effective to connect each of said first and second tank means in turn, successively and cyclically, to each of said first and second shock tubes, first electrode means, second electrode means, said first and second electrode means being located in said first shock tube and symmetrically with respect to the axis of said first shock tube, and electrically insulated therefrom, third electrode means, fourth electrode means, said third and fourth electrode means being located in said second shock tube, symmetrically with respect to the axis thereof and electrically insulated therefrom, means producing a magnetic field through said shock tubes, transversely thereof parallel to said electrode means, first terminal means connected to said first and third electrode means, second terminal means connected to said second and fourth electrode means thereby generating an alternating voltage output across said first and second terminal means.

3. A generator for producing alternating electric power from the interaction of ionised fluid impulses with a magnetic field comprising; at least one pair of shock tubes including a first shock tube and a second shock tube, said first and second shock tubes each having an input end and an output end, first distributor means, first tank means containing a first fluid at a first pressure and at a temperature of the order of between 1000° K. and 2000° K., second tank means containing a second fluid at a second pressure and at a temperature of the order of between 1000° K. and 2000° K., said first pressure and said second pressure being in the ratio of the order of between 1:2 and 1:50, said first distributor means being effective to connect each of said first and second tank means in turn, successively and cyclically, to each of said first and second shock tubes, second distributor means, first header means connected for fluid flow to said first tank means, second header means connected to said second tank means, said second distributor means being effective to connect each of said first and second shock tubes, in turn, successively and cyclically to each of said first and second header means, said first header means being effective to return fluid from said shock tubes to the pressure and temperature of the first fluid said second header means being effective to return fluid from said shock tubes to the temperature and pressure of said second fluid, first electrode means, second electrode means, said first and second electrode means being located in the walls of said first shock tube symmetrically with respect to the axis thereof and electrically insulated therefrom, third electrode means fourth electrode means, said third and fourth electrode means being located in the walls of said second shock tube, symmetrically with respect to the axis thereof and electrically insulated therefrom, means producing a magnetic field through said shock tubes, transversely thereof parallel to said electrode means, a first transformer winding connected across said first and second electrode means, a second transformer winding connected across said third and fourth electrode means, and a transformer secondary winding, in common with both said first and second transformer windings, providing an alternating current output from the generator.

4. A generator for producing alternating electric power from the interaction of ionised fluid impulses with a magnetic field comprising; at least one pair of shock tubes including a first shock tube and a second shock tube, said first and second shock tubes each having an input end and an output end, first distributor means, a first tank means containing a first fluid at a first pressure and at a temperature of the order of between 1000° K. and 2000° K., second tank means containing a second fluid at a second pressure and at a temperature of the order of between 1000° K. and 2000° K., said first pressure and said second pressure being in the ratio of the order of between 1:2 and 1:50, said first distributor means being effective to connect each of said first and second tank means in turn, successively and cyclically, to each of said first and second shock tubes, second distributor means, first header means connected for fluid flow to said first tank means, second header means connected to second tank means, said second distributor means being effective to connect each of said first and second shock tubes, in turn, successively and cyclically, to each of said first and second header means, said first header means being effective to return fluid from said shock tubes to the pressure and temperatures of the first fluid, said second header means being effective to return fluid from shock tubes to the temperature and pressure of said second fluid, first electrode means, second electrode means, said first and second electrode means being located in the walls of said first shock tube symmetrically with respect to the axis thereof and electrically insulated therefrom, third electrode means, fourth electrode means, said third and fourth electrode means being located in the walls of said second shock tube, symmetrically with respect to the axis thereof and electrically insulated therefrom, means producing a magnetic field through said shock tubes, transversely thereof parallel to said electrode means, first terminal means connected to said first and third electrode means, second terminal means connected to said second and fourth electrode means thereby generating an alternating voltage output across said first and second terminal means.

5. A generator for producing alternating electric power from the interaction of ionised fluid impulses with a magnetic field comprising; at least one pair of shock tubes including a first shock tube and a second shock tube, said first and second shock tubes each having an input end and output end, first distributor means, first tank means containing a first fluid at a first pressure and at a temperature of the order of between 1000° K. and 2000° K., second tank means containing a second fluid at a second pressure and at a temperature of the order of between 1000° K. and 2000° K., said first pressure and said second pressure being in the ratio of the order of between 1:2 and 1:50, said first distributor means being effective to connect each of said first and second tank means in turn successively and cyclically, to each of said first and second shock tubes, first electrode means, second electrode means, said first and second electrode means being located in the walls of said first shock tube and symmetrically with respect to the axis of said first shock tube, and electrically insulated therefrom, third electrode means, fourth electrode means, said third and fourth electrode means being located in the walls of said second shock tube and symmetrically with respect to the axis thereof and electrically insulated therefrom, said electrode means being segmented transversely to the axis of the respective one of said shock tubes, means producing a magnetic field through said shock tubes, transversely thereof parallel to said electrode means, a plurality of transformer primary windings individually connected across opposed segments of said electrode means, and a transformer secondary in common to all said primary windings providing an alternating current output from said generator.

6. A generator for producing alternating electric power from the interaction of ionised fluid impulses with a magnetic field comprising; at least one pair of shock tubes including a first shock tube and a second shock tube, said first and second shock tubes each having an input end and an output end, first distributor means, first tank means containing a first fluid at a first pressure and at a temperature of the order of between 1000° K. and 2000° K., second tank means containing a second fluid at a second pressure and at a temperature of the order of between 1000° K. and 2000° K., said first pressure and said second pressure being in the ratio of the order of between 1:2 and 1:50, said first distributor means being effective to connect each of said first and second tank means in turn successively and cyclically, to each of said first and second shock tubes, second distributor means, first header means connected to said first tank means, a second header means connected to said second tank means, said second distributor means being effective to connect each of said first and second shock tubes in turn successively and cyclically, to each of said first and second headers, said first header being effective to return fluid from said shock tubes to the pressure and temperature of the first fluid, said second header being effective to return fluid from shock tubes to the temperature and pressure of said second fluid, first electrode means, second electrode means, said first and second electrode means being located in the walls of said first shock tube and symmetrically with respect to the axis of said first shock tube, and electrically insulated therefrom, third electrode means fourth electrode means, said third and fourth electrode means being located in the walls of said second shock tube and symmetrically with respect to the axis thereof and electrically insulated therefrom, said electrode means being segmented transversely to the axis of the respective one of said shock tubes, means producing a magnetic field through said shock tubes, transversely thereof parallel to said electrode means, a plurality of transformer primary windings individually connected across opposed segments of said electrode means, and a transformer secondary in common to all said primary windings providing an alternating current output from said generator.

7. A method of producing alternating electric power from the interaction of ionised fluid impulses with a magnetic field comprising; introducing in turn, successively and cyclically into each shock tube of at least one pair of shock tubes, a first fluid at a first pressure and at a temperature of the order of between 1000° K. to 2000° K., and a second fluid at a second pressure and at a temperature of the order of between 1000° K. and 2000° K., the ratio of the first pressure to the second pressure being of the order of between 1:2 and 1:50 whereby ionised fluid impulses, in the form of shock waves are passed alternately through said shock tubes, applying a magnetic field across said shock tubes, providing an opposed pair of electrodes in each shock tube, each of said pairs of electrodes being parallel to said magnetic field, and connecting said electrodes to output terminal means to provide thereat an alternating voltage having a cycle comprising a half cycle provided from said pair of electrodes of each of said shock tubes.

8. A method of producing alternating electric power from the interaction of ionised fluid impulsed with a magnetic field comprising; introducing in turn, successively and cyclically into each shock tube of at least one pair of shock tubes, a first fluid at a first pressure and at a temperature of the order of between 1000° K. to 2000° K., and a second fluid at a second pressure and at a temperature of the order of between 1000° K. and 2000° K. the ratio of the first pressure to the second pressure being of the order of between 1:2 and 1:50 whereby ionised fluid impulses, in the form of shock waves are passed alternately through said shock tubes, applying a magnetic field across said shock tubes, providing an opposed pair of electrodes in each shock tube, each of said pairs of electrodes being parallel to said magnetic field, connecting said electrodes to output terminal means to provide thereat an alternating voltage having a cycle comprising a half cycle provided from said pair of electrodes of each of said shock tubes, taking up the fluids leaving said shock tubes and returning said fluids to respective sources through heat and pressure exchange means to return said fluids to the first and second pressures appropriate to the particular source to which they are returned and to the starting temperature of the order of between 1000° K. and 2000° K.

No references cited.

DAVID X. SLINEY, *Primary Examiner.*